United States Patent [19]

Mine et al.

[11] Patent Number: 4,649,940
[45] Date of Patent: Mar. 17, 1987

[54] METHOD AND APPARATUS FOR THRESHING RIBS FROM TOBACCO LEAVES AND THE LIKE

[75] Inventors: Taiichi Mine, Hadano; Busaburo Sakabe, Yokohama; Kiyomi Sato, Hadano, all of Japan

[73] Assignee: The Japan Tobacco & Salt Public Corporation, Tokyo, Japan

[21] Appl. No.: 631,769

[22] Filed: Jul. 17, 1984

[30] Foreign Application Priority Data

Jul. 21, 1983 [JP] Japan ................. 58-131977

[51] Int. Cl.$^4$ ................. A01D 45/16; A01F 11/00
[52] U.S. Cl. ................. 130/30 R; 131/312; 130/30 E
[58] Field of Search ................. 130/30 R, 30 E, 30 H, 130/6; 131/312, 313, 317, 318

[56] References Cited

U.S. PATENT DOCUMENTS

| 695,120 | 3/1902 | Sanders | 130/30 E |
| 2,922,450 | 1/1960 | Barbee | 130/30 E |
| 4,323,083 | 4/1982 | Cogbill, II | 131/312 |

FOREIGN PATENT DOCUMENTS 50-6558  5/1975  Japan .................. 131/312

Primary Examiner—Gene Mancene
Assistant Examiner—David L. Tarnoff

[57] ABSTRACT

A method and apparatus for threshing ribs from tobacco leaves and the like. The method comprises a basket having a grid in which a threshing gear formed with a rotary drum including teeth on its periphery is accommodated in such a manner that the outside portion of the gear is disposed spacedly adjacent to it, supplying raw material to the space between the threshing gear and the basket from one side of the axial direction by an air flow at a predetermined speed corresponding to the peripheral speed of the gear, rotating the gear and basket at different peripheral speeds and discharging raw material toward the crossing direction of the axis. The apparatus comprises a casing, a threshing gear formed with a rotary drum having teeth, a basket having a grid and surrounding the gear, the gear and basket being rotated at different peripheral speeds, a material supply port, a feed duct and a discharge opening.

4 Claims, 5 Drawing Figures

METHOD AND APPARATUS FOR THRESHING RIBS FROM TOBACCO LEAVES AND THE LIKE

BACKGROUND OF THE INVENTION

This invention relates to a method and apparatus for threshing the mid-ribs from tobacco leaves and the like.

In the prior art, as disclosed in Japanese Patent Publication No. 50-6558, for threshing the mid-ribs from tobacco leaves by means of a threshing gear and a basket which are rotated independently within a spiral casing, raw material is supplied from a spiral supply port axially adjacent to said both threshing gear and basket by means of a circulating air flow and through a spiral fan. It is almost impossible for this type of apparatus to supply a large quantity of raw material or treat a large quantity thereof at a time.

SUMMARY OF THE INVENTION

It is therefore an object of the present invention to provide a method and apparatus for threshing ribs from tobacco leaves and the like which can treat raw material in a large quantity at a time.

Another object of the invention is to provide a method and apparatus for threshing ribs from tobacco leaves and the like wherein a high threshing ratio can be obtained without tearing tobacco leaves into too small pieces as much as possible.

A further object of the present invention is to provide a method and apparatus which can prevent stagnancy of a part of raw material.

To achieve the above mentioned objects and others, there is essentially provided a method for threshing ribs from tobacco leaves and the like comprising providing a basket having a grid in which a threshing gear formed with a rotary drum including teeth on its periphery is accommodated in such a manner as that the outside portion of said threshing gear is disposed spacedly adjacent thereto, supplying raw material to the space defined between said gear and said basket from one side of the axis thereof by means of an air flow in the axial direction at a predetermined speed corresponding to the peripheral speed of said threshing gear, rotating said gear and said basket at different peripheral speed for threshing ribs, and discharging raw material after threshed toward the crossing direction with respect to the other side of the axial direction by means of said air flow. There is also provided an apparatus for threshing ribs from tobacco leaves and the like comprising a casing formed in a spiral configuration and mounted on a base, a threshing gear formed with a rotary drum having teeth in its periphery, a basket having a grid and spacedly surrounding said gear, both gear and basket being accommodated with said casing in such a manner as to be rotated at different peripheral speeds by rotating means, a raw material supply port formed in a side plate of said casing and corresponding to the space defined between said gear and said basket, a feed duct feeding air and raw material into said basket and connected to said raw material supply port, and a discharge opening formed at a lower position of a peripheral side plate of said casing and biased to the other side from said supply port with respect to the central portion of the axis.

DETAILED DESCRIPTION OF THE EMBODIMENTS

Figure 1:
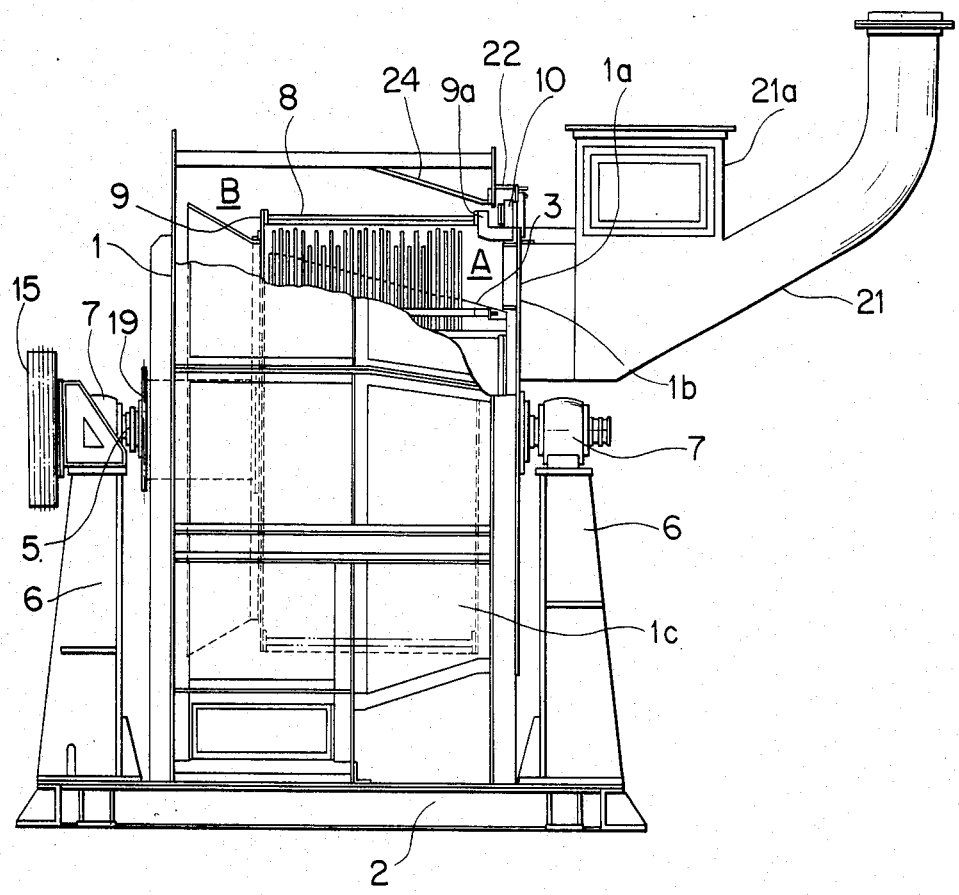
FIG. 1 is a front view of an apparatus, partly cut away, according to the present invention.
Figure 2:
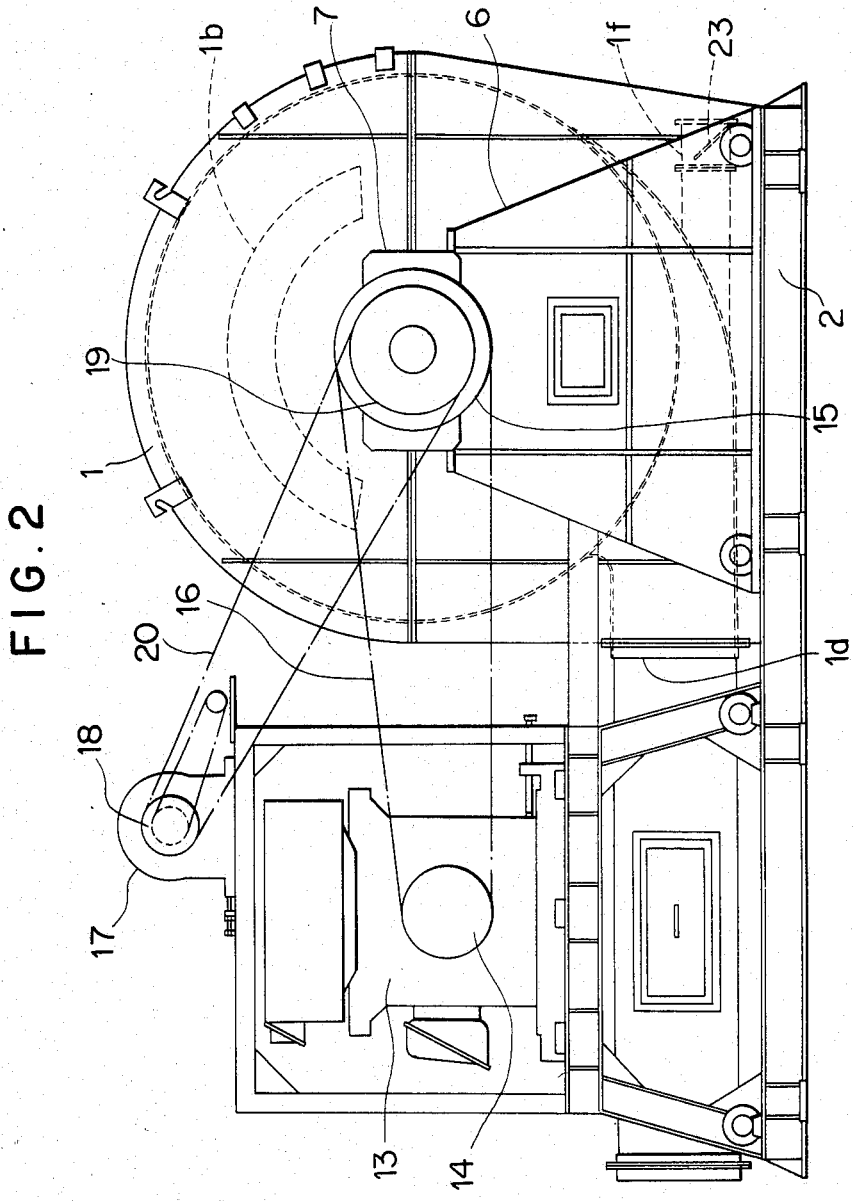
FIG. 2 is a side view of the above.
Figure 3:
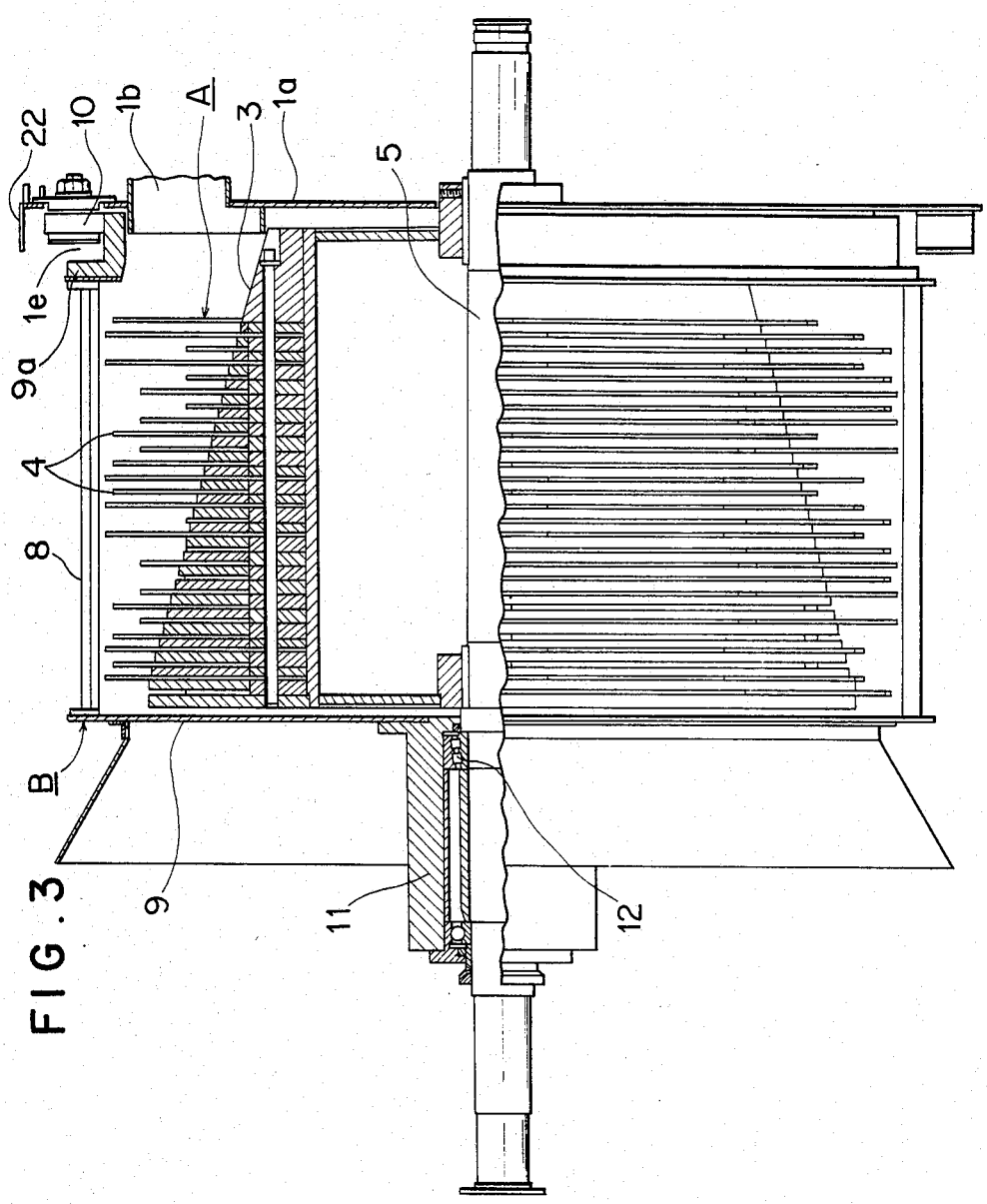
FIG. 3 is a sectional view of the main portion.

A preferred embodiment of the present invention will be described with reference to the accompanying drawings wherein like numerals denote like or corresponding parts throughout several sheets.

In the drawing, 1 denotes a spiral casing which is mounted on a base 2. Within said spiral casing 1, rotatably provided at different peripheral speeds are threshing gear A and a basket B enclosing said threshing gear A.

Said threshing gear A is formed with a rotary drum 3 and teeth 4, said teeth being arranged spirally or lineally in the periphery of said rotary drum 3 either in equally divided way on its circumference or several rows in the axial direction thereof. A rotary shaft 5 of said drum 3 or threshing gear A is carried by a bearing 7 on a frame 6. Said rotary drum 3 is formed as such that the diameter thereof becomes gradually larger toward its inside from the raw material supply side and the overall configuration thereof is formed in a generally truncated cone shape or a cone shape. Said teeth 4 are provided on the rotary drum 3 in a manner not to contact and yet to be close to the grid of the basket B as will be described hereinafter.

The grid 8 of the basket B is normally formed with a lot of cross pieces mounted on the periphery of a basket frame 9 in parallel with the afore-mentioned rotary shaft 5. It may be formed with a cross stripe pattern or perforated pattern.

The basket frame 9 is provided with an annular frame 9a at its raw material supply side. The outer periphery of the annular frame 9a is pivotally carried by a plurality of carrier rollers 10 concentric with said rotary shaft 5, said carrier rollers 10 being circumferentially arranged on the inner periphery of the raw material supply side of said casing 1. Said basket frame 9 is provided with a boss 11 at the central portion of the other side thereof. Said boss 11 is pivotably provided with respect to the rotary shaft 5 through a bearing 12 so that the basket B is independently rotatable with respect to the threshing gear A.

Said threshing gear A is driven by a variable-speed electric motor 13 through pulleys 14, 15 and a belt 16. On the other hand, said basket B is driven by another variable-speed electric motor 17 through sprockets 18, 19 and a chain 20.

A raw material supply port 1b is formed on a side plate 1a. A draft air duct 21 is connected to said raw material supply port 16. Raw material is thrown into an upper branch pipe 21a of said draft air duct 21. The raw material supply port 1b is formed in a fan shape concentric with said threshing gear A. This may be taken in the form of an annulation. With this construction, raw material is supplied from the side of said threshing gear A toward the rotary axis and in the crossing direction with respect to said threshing gear A.

A discharge opening $1d$ is formed in the lower position of a peripheral side plate $1c$ biased from the central portion of the axial direction of the threshing gear A and the basket B in the departing direction when viewed from the raw material supply side.

Furthermore, a plurality of air openings $1e$ are concentrically provided with respect to the basket 10 in said side plate $1a$ of the spiral casing 1 in such a manner that they are adjustable by a closing plate 22 at the portion where said carrier roller 10 is positioned in order to introduce a secondary air in the direction of the shaft 5.

Furthermore, an air opening $1f$ is provided at a position opposite to said discharge opening $1d$ in the peripheral side plate $1c$ of the spiral casing 1 in such a manner that it is adjustable by a damper 23 in order to introduce a secondary air in the tangent direction with respect to the basket B.

On the raw material supply side within the spiral casing 1, a slant guide plate 24 is circumferentially arranged corresponding to the outer peripheral configuration of the cone-shaped rotary drum 3 in its axial direction in order to prevent the stagnancy of raw material at the supply side and enhance its dispersion.

With the foregoing constitution, raw material such as tobacco leaves and the like is introduced into the space defined between said threshing gear A and said basket B from the supply port $1b$ by means of a primary air flow at a velocity of from 5 to 24 m/sec in the parallel direction with respect to the rotary shaft 5. The threshing gear A is speed variable, and adjusted its peripheral speed normally in the range of from 10 to 30 m/sec. The basket B is also speed variable and adjusted its peripheral speed in the range of from 0.1 to 3 m/sec.

The velocity of the primary air flow is preliminarily set corresponding to the peripheral speed of the threshing gear A. The raw material is evenly dispersed and spread over the area in the wide section of both of the threshing gear A and the basket B, or from the entrance port to the innermost area. On the other hand, since the configuration of the opening of the supply port $1b$ is formed in a fan-shape or annular shape, raw material is supplied so as to be widely dispersed and spread in the peripheral direction of the threshing gear A and the basket B.

Figure 4:
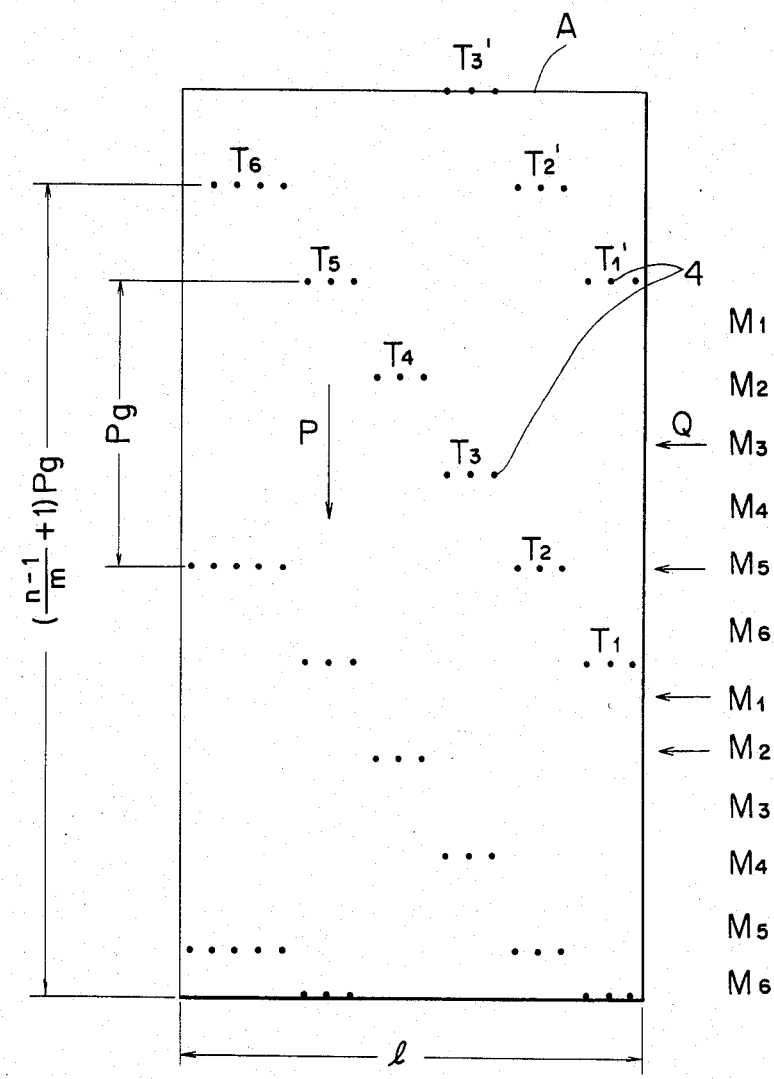
FIG. 4 is a schematic view illustrating how the raw material is supplied to a threshing gear.

FIG. 4 is a schematic view illustrating in plan how the raw material is supplied to the threshing gear A. When the block number of the teeth spirally arranged is set as block number $=n$ (6 pcs.), the circumferential pitch of the teeth as circumferential pitch $=Pg$ (approx. 400 mm), the divided number within the circumferential pitch of the teeth as divided number $=m$ (4), threshing effective width $=l$ (500 mm), threshing gear peripheral speed $=Vg$ (18 m/s), and raw material throwing-in velocity $=Vt$ (10 m/s), the relation between the threshing gear rotating in the direction as shown by an arrow P and the raw material throwing-in velocity in the direction as shown by an arrow Q is obtained as follow:

$$\frac{Vg}{Vt} = \frac{\left(\frac{n-1}{m} + 1\right) Pg}{l}$$

In the above example, the following relation is obtained:

$$Vt = \frac{Vg \cdot l}{\left(\frac{n-1}{m} + 1\right) Pg}$$

$$= \frac{18 \times 0.5}{\left(\frac{6-1}{4} + 1\right) 0.4}$$

$$= 10 \ m/s$$

Raw material $M'_1 - M'_6$ and $M_1 - M_6$ is spread in the opening width of the supply port and supplied into the space defined between the threshing gear and the basket at the above mentioned throwing-in velocity. In this case, an arrangement is made so that raw material $M_1$, $M_2$ and $M_6$ are hung by the corresponding teeth $T_1$, $T_2$ and $T_6$, respectively.

Raw material supplied into the basket B travels along the periphery of the rotary drum 3 of a truncated cone shape or a cone shape of the threshing gear A, and then with the help of the centrifugal force arrives at the tip portion of each of the teeth 4 evenly and rapidly, whereby raw material is threshed apart into mid-ribs and leaves due to the threshing effect based on the difference of the peripheral speeds of the teeth 4 and the grid 8 of the basket B, and the effect of the air flow circulating along the inner surface of the spiral casing 1 through the grid 8.

The mixture of the threshed mid-ribs and leaves circulatingly advances along the inner surface of the spiral casing 1 of the outer periphery of the basket B through the gap of the grid 8, and is discharged from the discharge opening $1d$. In this case, although the threshed mid-ribs with a comparatively high gravity is apt to remain on the bottom of the spiral casing 1, the secondary air taken in from the the air openings $1e$ and $1f$ effectively prevents it.

Figure 5:
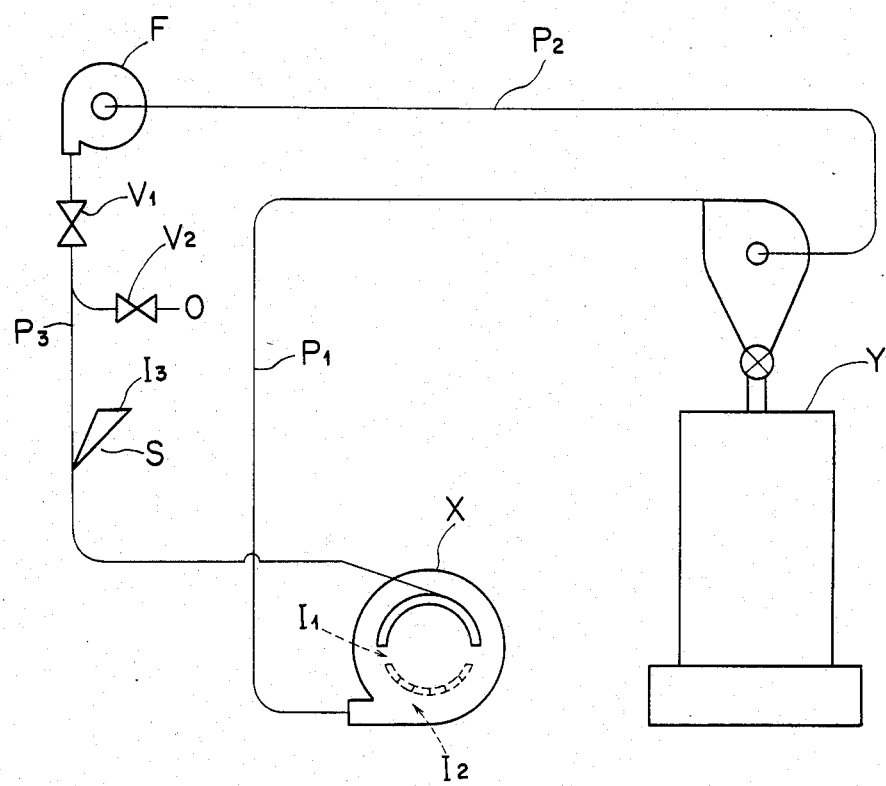
FIG. 5 is a view showing a ventilation system, wherein the present invention is connected to other relevant equipments.

In FIG. 5, character X denotes an apparatus according to the present invention; Y denotes an air threshing equipment; F denotes an air blower; S denotes a raw material throwing-in port; $P_1$, $P_2$ and $P_3$ denote draft air ducts; $V_1$ and $V_2$ denote dampers; and $I_1$, $I_2$ and $I_3$ denote fresh airs and O denotes an exhaust. The ventilation system is carried by the circulation system, and a certain amount of air corresponding to the fresh air which is required to purify the circulation air and facilitate the smooth supply of raw material is discharged as an exhaust.

EXAMPLE

2000 Kg/hr of yellow color leaf tobacco in its entirety containing from 16 to 18% of water and with an article temperature of 60° C. is accompanied by 80 m$^3$/min of air and supplied to the apparatus according to the present invention formed with 800 mm in diameter of a basket, 510 mm of a basket width, 140 mm of a grid gap, 6 circumferentially equal parts and 20 rows in the axial direction of the teeth of a threshing gear in order to thresh the mid-ribs from the leaves by rotating at the peripheral speeds of 21 m/sec of the threshing gear and 1 m/sec of the basket in the peripheral direction. As a result, an extremely favorable result is obtained as from 75 to 80% of a threshing ratio and from 6 to 7% of the threshed leaves with a size less than 13 mm in diameter compared with 10% of the prior art.

As will be apparent from the foregoing, the present invention enables to thresh the mid-ribs from the leaves in a large quantity at a time and in an even state, and facilitate the smooth flow of raw material by effectively preventing its stagnancy.

What is claimed is:

1. A method of removing ribs from tobacco leaves or the like comprising
    rotating a truncated conical drum about a rotational axis within a casing, said truncated conical drum having large and small diameter axial ends and a plurality of teeth on said conical surface between said axial ends;
    providing a basket within said casing to enclose said truncated conical drum for axial rotation, said basket having a grid structure extending along the conical drum conical surface along the rotational axis rotating said truncated conical drum and said basket about said rotational axis at different speeds;
    blowing tobacco leaves into said basket in a direction parallel to said rotational axis around said small diameter end of said truncated conical drum and toward said large diameter end;
    flowing said tobacco leaves along said conical surface and against and on said teeth on said conical surface;
    moving the tobacco leaves away from said conical surface to be moving generally radially away from the rotational axis and through said grid structure extending along said conical surface; and
    discharging the tobacco leaves out of said casing in a direction perpendicular to said rotational axis.

2. A method of removing ribs from tobacco leaves or the like according to claim 1, wherein said blowing step includes blowing said tobacco leaves over a substantially arcuate area around the small diameter end of the truncated conical drum.

3. An apparatus for removing ribs from tobacco leaves or the like comprising
    a casing defined by a plurality of walls;
    a rotating truncated conical drum provided within said casing, said rotating truncated conical drum provided having large and small diameter axial ends and a plurality of teeth on the conical periphery of said drum between said axial ends;
    a rotating basket provided within said casing to enclose said truncated conical drum in cooperation with a selected one of said walls such that the small diameter axial end is positioned adjacent to said selected wall and said rotating truncated conical drum and said rotating basket define an annular space therebetween, said truncated conical drum and said basket rotating about a common axis, and means for rotating said conical drum and said basket at different speeds about said common axis, said basket having a grid structure extending along said conical drum conical surface and along said common axis, said selected wall having a port means formed therein around said small diameter axial end, said casing having a discharge port opening in a tangential direction port; and
    means for blowing tobacco leaves through said port means into said annular space between the rotating truncated conical drum and the basket and against said teeth on said conical drum surface.

4. An apparatus for removing ribs from tobacco leaves or the like according to claim 3, wherein said port means includes an arcuate port extending around the small diameter axial end of the truncated conical drum.

* * * * *